(12) United States Patent
Murata et al.

(10) Patent No.: US 10,208,795 B2
(45) Date of Patent: Feb. 19, 2019

(54) TAPERED ROLLER BEARING

(71) Applicant: JTEKT CORPORATION, Osaka-shi, Osaka (JP)

(72) Inventors: Junji Murata, Kashiba-shi (JP); Shigeo Kamamoto, Kashiwara (JP); Yuki Shishihara, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/631,953

(22) Filed: Jun. 23, 2017

(65) Prior Publication Data
US 2018/0003229 A1 Jan. 4, 2018

(30) Foreign Application Priority Data

Jun. 30, 2016 (JP) .................................. 2016-130394

(51) Int. Cl.
| | |
|---|---|
| *F16C 19/36* | (2006.01) |
| *F16C 33/36* | (2006.01) |
| *F16C 33/46* | (2006.01) |
| *F16C 33/66* | (2006.01) |

(52) U.S. Cl.
CPC .......... *F16C 33/366* (2013.01); *F16C 19/364* (2013.01); *F16C 33/4605* (2013.01); *F16C 33/4617* (2013.01); *F16C 33/4635* (2013.01); *F16C 33/6629* (2013.01); *F16C 33/6681* (2013.01)

(58) Field of Classification Search
CPC .... F16C 19/364; F16C 33/366; F16C 33/383; F16C 33/385; F16C 33/386; F16C 33/4605; F16C 33/4617; F16C 33/4635; F16C 33/4676; F16C 33/4682; F16C 33/664; F16C 33/6674; F16C 33/6681
See application file for complete search history.

(56) References Cited

U.S. PATENT DOCUMENTS

| | | | | |
|---|---|---|---|---|
| 1,840,607 A | * | 1/1932 | Scribner | F16C 19/364 384/565 |
| 4,664,537 A | * | 5/1987 | Ascheron | F16C 19/364 384/470 |
| 4,707,152 A | * | 11/1987 | Neese | F16C 19/364 384/572 |

(Continued)

FOREIGN PATENT DOCUMENTS

| | | |
|---|---|---|
| JP | 2014-202341 A | 10/2014 |
| JP | 2014214771 | * 11/2014 |

*Primary Examiner* — James Pilkington
(74) *Attorney, Agent, or Firm* — Oliff PLC

(57) ABSTRACT

A tapered roller bearing includes an inner ring, an outer ring, a plurality of tapered rollers provided in an annular space formed between the inner and outer rings and rolling on an inner raceway surface and an outer raceway surface, and an annular cage that holds the tapered rollers. The cage has a small annular portion positioned toward an axially first side with respect to the tapered rollers, a large annular portion positioned toward an axially second side with respect to the tapered rollers, and a plurality of cage bars that couples the small annular portion and the large annular portion together. A minute clearance is formed between the inner ring and the large annular portion and between the outer ring and the large annular portion, respectively.

2 Claims, 6 Drawing Sheets

(56) References Cited

U.S. PATENT DOCUMENTS

2014/0013603 A1* 1/2014 Miyachi .............. F16C 33/46
 29/898.064
2015/0323008 A1* 11/2015 Koganei .............. F16C 19/364
 384/564

* cited by examiner

TAPERED ROLLER BEARING

INCORPORATION BY REFERENCE

The disclosure of Japanese Patent Application No. 2016-430394 filed on Jun. 30, 2016 including the specification, drawings and abstract, is incorporated herein by reference in its entirety.

BACKGROUND OF THE INVENTION

1. Field of the Invention

The invention relates to a tapered roller bearing.

2. Description of the Related Art

Tapered roller bearings are widely used for various machines and used, for example, as bearings for differential pinions in ordinary-sized automobiles. For ordinary-sized automobiles, reduced rotational resistance of components contributes to a reduction in fuel consumption. Thus, in particular, there has been a demand to reduce a torque applied to a tapered roller bearing used for a travel driving system. Resistance resulting from rotation of the tapered roller bearing includes stirring resistance of lubricant. Thus, when a tapered roller bearing is used for a differential pinion in an ordinary-sized automobile, a cage may be used to limit flow of lubricant into a bearing interior so as to inhibit an excessive amount of lubricant from being fed into the bearing interior (see, for example, Japanese Patent Application Publication No. 2014-202341 (JP 2014-202341 A).

Specifically, rotation of the tapered roller bearing results in a pump action that allows the lubricant to flow from a first side (in FIG. 7, a left side) to a second side (in FIG. 7, a right side) in an axial direction. This restrains the lubricant in a bearing exterior on the axially first side from flowing into the bearing interior (annular space 96) between an inner ring 91 and an outer ring 92. To achieve this, a clearance between a small annular portion 94 of a cage 93 and an axially-first-side end 95 of the inner ring 91 is reduced in size. A clearance between the small annular portion 94 and the outer ring 92 is also reduced in size. This inhibits an excessive amount of lubricant from being fed into the annular space 96 as a result of the pump action. Thus, the stirring resistance of the lubricant can be reduced, enabling contribution to a reduction in fuel consumption.

Unlike the ordinary-sized automobiles, construction machines such as wheel loaders, are often used in harsh environments. Consequently, for tapered roller bearings for such construction machines, reduced temperature elevation has been more desirable than a reduction in the stirring resistance of the lubricant during rotation of the bearing. In such construction machines, a differential apparatus has a complicated internal structure. Thus, in such construction machines, feeding of a sufficient amount of lubricant into the bearing interior often fails unlike in the ordinary-sized automobiles. As a result, the failure to feed the lubricant to the tapered roller bearing leads to a rise in temperature, causing seizure and the like.

SUMMARY OF THE INVENTION

An object of the invention is to provide a tapered roller bearing in which, even if an environment in the bearing is such that only a small amount of lubricant is present around the bearing, the lubricant can be effectively utilized.

A tapered roller bearing in an aspect of the invention includes an inner ring having, on an outer peripheral side, a conical inner raceway surface with a diameter increasing from an axially first side toward an axially second side, an outer ring having, on an inner peripheral side, a conical outer raceway surface with a diameter increasing from the axially first side toward the axially second side, a plurality of tapered rollers provided in an annular space formed between the inner ring and the outer ring and rolling on the inner raceway surface and the outer raceway surface, and an annular cage that holds the tapered rollers. The cage has a small annular portion positioned toward the axially first side with respect to the tapered rollers, a large annular portion positioned toward the axially second side with respect to the tapered rollers, and a plurality of cage bars that couples the small annular portion and the large annular portion together. A minute clearance is formed between the inner ring and the large annular portion and between the outer ring and the lame annular portion, respectively.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
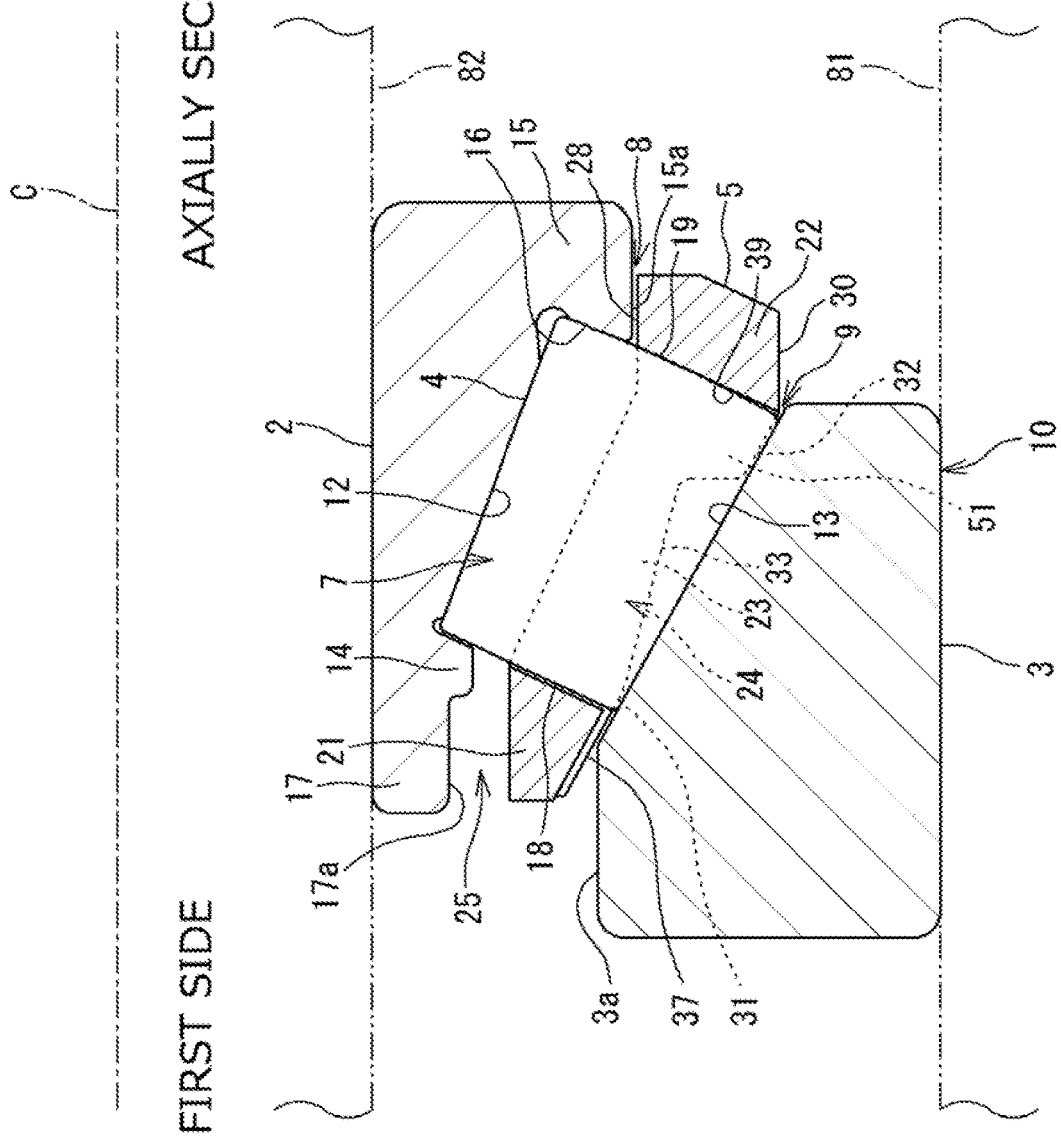
FIG. 1 is a sectional view depicting an embodiment of a tapered roller bearing.

An embodiment of the invention will be described below based on the drawings. FIG. 1 is a sectional view depicting an embodiment of a tapered roller bearing. A tapered roller bearing 10 is used for a differential pinion in a construction machine such as a wheel loader. The tapered roller bearing 10 supports, in a housing 81, a shaft 82 that rotates along with a pinion, so as to make the shaft 82 rotatable. Lubricant (oil) is stored in the housing 81. The lubricant is used to lubricate the tapered roller bearing 10. The tapered roller bearing 10 described below may also be used for other applications.

The tapered roller bearing 10 includes an inner ring 2, an outer ring 3, a plurality of tapered rollers 4, and a cage 5. The inner ring 2, the outer ring 3, and the cage 5 are annular members all centered around a common axis C.

The inner ring 2 is formed using bearing steel, steel for machine structural use, or the like and has an inner raceway surface 12 formed on an outer peripheral side of the inner ring 2 and on which the tapered rollers 4 roll. The inner raceway surface 12 has a conical shape (tapered shape) having a diameter increasing from an axially first side (in FIG. 1, a left side) toward an axially second side (in FIG. 1, a right side). The inner ring 2 has a cone front face rib (hereinafter, referred to as a small rib) 14, a cone back face rib (hereinafter, referred to as a large rib) 15, and a cylindrical portion 17. The small rib 14 is provided on the axially first side with respect to the inner raceway surface 12 and protrudes outward in a radial direction. The large rib 15 is provided on the axially second side with respect to the inner raceway surface 12 and protrudes outward in the radial direction. The cylindrical portion 17 extends from the small rib 14 toward the axially first side.

The outer ring 3 is formed using bearing steel, steel for machine structural use, or the like, and has, on an inner peripheral side, an outer raceway surface 13 that faces the inner raceway surface 12 and on which the tapered rollers 4 roll. The outer raceway surface 13 has a conical shape (tapered shape) having a diameter increasing from the axially first side toward the axially second side.

The tapered rollers 4 are members formed using bearing steel or the like. The tapered rollers 4 are provided in an annular space 7 formed between the inner ring 2 and the outer ring 3, and can roll on the inner raceway surface 12 and the outer raceway surface 13. Each of the tapered rollers 4 has a small end face 18 located on the axially first side and having a small diameter and a large end face 19 located on the axially second side and having a large diameter. The large end face 19 is in contact with a rib surface (side surface) 16 of the large rib 15 of the inner ring 2. Rotation of the tapered roller bearing 10 (in the present embodiment, the inner ring 2) brings the large end face 19 and the rib surface 16 into sliding contact with each other.

Figure 2:
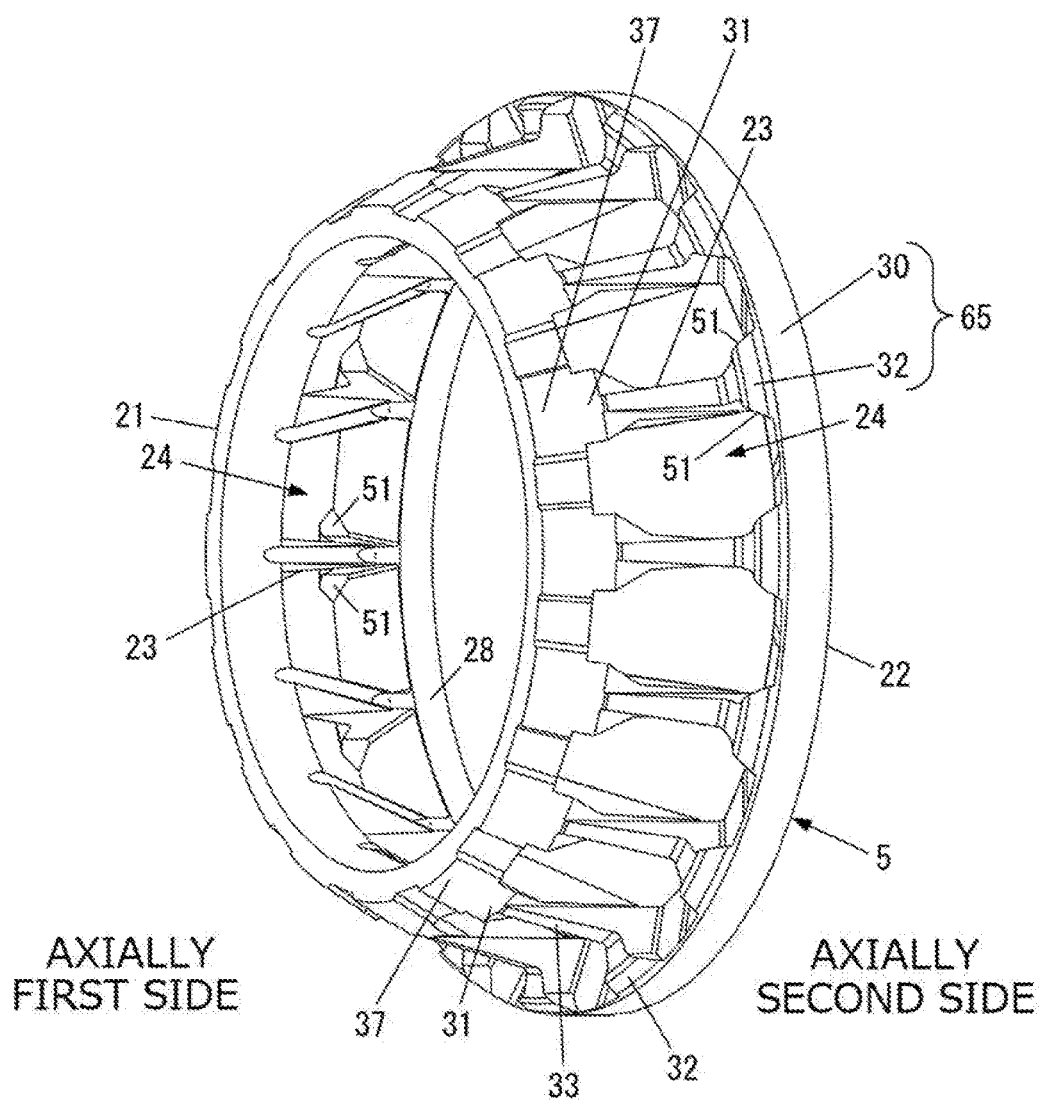
FIG. 2 is a perspective view of a cage.

The cage 5 is provided in the annular space 7 along with the tapered rollers 4 to hold the tapered rollers 4. FIG. 2 is a perspective view of the cage 5. In FIG. 1 and FIG. 2, the cage 5 has a small annular portion 21 shaped like a ring, a large annular portion 22 shaped like a ring, and a plurality of cage bars 23. The small annular portion 21 is positioned toward the axially first side with respect to the tapered rollers 4. The large annular portion 22 is positioned toward the axially second side with respect to the tapered rollers 4. The cage bars 23 couple the small annular portion 21 and the large annular portion 22 together. The large annular portion 22 has a larger outside diameter than the small annular portion 21, and in the present embodiment, also has a larger bore diameter than the small annular portion 21. The cage bars 23 are provided at intervals in a circumferential direction. Pockets 24 in which the respective tapered rollers 4 are housed (held) are spaces each formed between the small annular portion 21 and the large annular portion 22 and between two cage bars 23, 23 adjacent to each other in the circumferential direction. The circumferential direction is a direction around an axis C of the tapered roller bearing 10. The cage 5 in the present embodiment is formed of resin (formed of a synthetic resin) by injection molding.

In the tapered roller bearing 10, rotation of the bearing (inner ring 2) results in a pump action that allows lubricant to flow from the axially first side toward the axially second side. The mechanism of generation of the pump action is as described below. The lubricant and air present in the annular space 7 have force components that act outward in the radial direction based on a centrifugal force resulting from rotation of the bearing. The outer raceway surface 13 of the outer ring 3 has a conical shape as described above. Thus, the lubricant and air in the annular space 7 flow toward the axially second side along the outer raceway surface 13. Generation of this flow leads to an action that draws the lubricant and air present in a bearing exterior on the axially first side, into the annular space 7. Consequently, the tapered roller bearing 10 is subjected to the pump action that allows the lubricant to flow from the axially first side to the axially second side.

Figure 3:
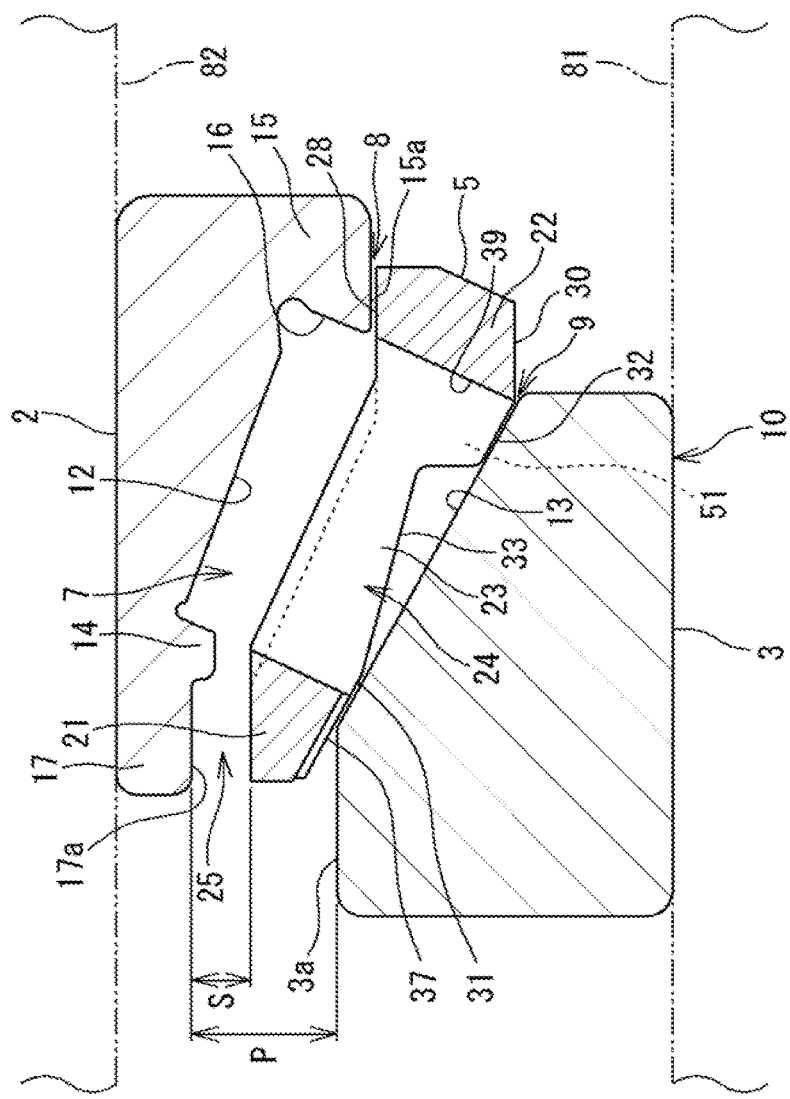
FIG. 3 is a sectional view corresponding to the sectional view depicted in FIG. 1 and from which a tapered roller is removed.

FIG. 3 is a sectional view corresponding to the sectional view depicted in FIG. 3 and from which the tapered roller 4 is removed. On the axially first side of the cage bars 23 and on a radially outer side of the cage bars 23 (closer to the outer ring 3 than to the inner ring 2), the cage 5 has a first guide surface 31 that can come into contact with a part of an inner peripheral surface (outer raceway surface 13) of the outer ring 3. On the axially second side of the cage bars 23 and on the radially outer side of the cage bars 23 (closer to the outer ring 3 than to the inner ring 2), the cage 5 has a second guide surface 32 that can come into contact with another part of the inner peripheral surface (outer raceway surface 13) of the outer ring 3. A recessed surface 33 is formed between the first guide surface 31 and the second guide surface 32 and away from the inner peripheral surface of the outer ring 3.

When the cage 5 and the outer ring 3 are concentrically placed (as illustrated in FIG. 3), a minute clearance is formed between the first guide surface 31 and the inner peripheral surface of the outer ring 3. A minute clearance is formed between the second guide surface 32 and the inner peripheral surface of the outer ring 3. In contrast, radial displacement of the cage 5 with respect to the outer ring 3 allows the first guide surface 31 to come into contact with the inner peripheral surface of the outer ring 3, while allowing the second guide surface 32 to come into contact with the inner peripheral surface of the outer ring 3. Thus, the cage 5 can come into contact with the inner peripheral surface of the outer ring 3 so that the contact allows the cage to be positioned in the radial direction. In other words, the tapered roller bearing 10 is an outer-ring guiding bearing in which the cage 5 is guided by the outer ring 3.

In FIG. 2, each of the cage bars 23 of the cage 5 has retaining portions 51 on the axially second side of the cage bar 23. The retaining portions 51 are provided on a radially outer side of the cage bar 23 so as to protrude toward opposite sides in the circumferential direction. As also described below in "assembly of the tapered roller bearing 10", the retaining portions 51 come into contact with the corresponding tapered roller 4 from a radially outer side of the tapered roller 4 to allow the tapered roller 4 to be inhibited from falling outward in the radial direction.

Assembly of the tapered roller bearing 10 (see FIG. 1) will be described. In the tapered roller bearing 10, the tapered rollers 4 are housed in the respective pockets 24 in the cage. A unit including the cage 5 and the tapered rollers 4 is attached to an outer peripheral side of the inner ring 2 at a predetermined position (the position where the tapered rollers 4 contact the inner raceway surface 12) to form a semi-finished product. Subsequently, the outer ring 3 is moved closer to the semi-finished product in the axial direction and positioned outward of the tapered rollers 4 in the radial direction to form a finished product. As described above, in the semi-finished product, each of the tapered rollers 4 is prevented by the small rib 14 and the large rib 15 of the inner ring 2 from falling (moving) toward the opposite sides in the axial direction, and also prevented by the retaining portions 51 of the cage 5 from falling (moving) outward in the radial direction.

As depicted in FIG. 2, a radially outer surface of the each retaining portion 51 and an outer peripheral surface 30 of the large annular portion 22 are formed so as to be continuous with each other. In the present embodiment, the radially outer surface of the retaining portion 51 and the outer peripheral surface 30 of the large annular portion 22 are continuous with each other so as to have a bending angle between the surfaces. The inner peripheral surface (outer raceway surface 13) of the outer ring 3 can be brought into contact with a part of a surface including the radially outer surface of the retaining portion 51 and the outer peripheral surface 30 of the large annular portion 22. This contact allows the cage 5 to be positioned in the radial direction. In the present embodiment, the radially outer surface of the retaining portion 51 corresponds to the second guide surface 32 that can come into contact with the inner peripheral surface (outer raceway surface 13) of the outer ring 3.

As depicted in FIG. 1 and FIG. 3, the small annular portion 21 of the cage 5 and the outer ring 3 are located close to each other (or can come into contact with each other) but the small annular portion 21 and the inner ring 2 are located away from each other. An annular space portion 25 is formed between the small annular portion 21 and (a part of) the cylindrical portion 17 located on the axially first side of the inner ring 2. A radial dimension S (see FIG. 3) of the space portion 25 is larger than a radial dimension of a clearance formed between an outer peripheral surface 37 of the small annular portion 21 and the outer raceway surface 13 of the outer ring 3. The space portion 25 enables the lubricant present in the bearing exterior on the axially first side to pass into the annular space 7. In FIG. 3, the radial dimension S of the space portion 25 may be, for example, at least 30% and less than 60% of a radial dimension P between an outer peripheral surface 17a of the inner ring 2 (cylindrical portion 17) and a cylindrical surface 3a of the outer ring 3 at which the bore diameter of the outer ring 3 is minimized.

In FIG. 1, an outer peripheral surface 15a of the large rib 15 of the inner ring 2 is a cylindrical surface. An inner peripheral surface 28 of the large annular portion 22 of the cage 5 is a cylindrical surface. The large rib 15 of the inner ring 2 and the large annular portion 22 are located close to each other. A minute clearance 8 is formed between the inner peripheral surface 28 of the large annular portion 22 and the outer peripheral surface 15a of the large rib 15 so as to hinder passage of the lubricant. The minute clearance 8 may have a radial dimension of, for example, 0.5 millimeters or less.

Thus, after the lubricant passes through the annular space portion 25 located on the axially first side and then enters into the annular space 7, most of the lubricant can remain in the annular space 7 without passing through the minute clearance 8. The lubricant is fed into the area between the rib surface 16 of the large rib 15 and the large end face 19 of each tapered roller 4 (see FIG. 1). As described above, rotation of the bearing allows the rib surface 16 and the large end face 19 to come into sliding contact with each other. The lubricant fed to the rib surface 16 can contribute to lubrication of this sliding contact portion.

Figure 4:
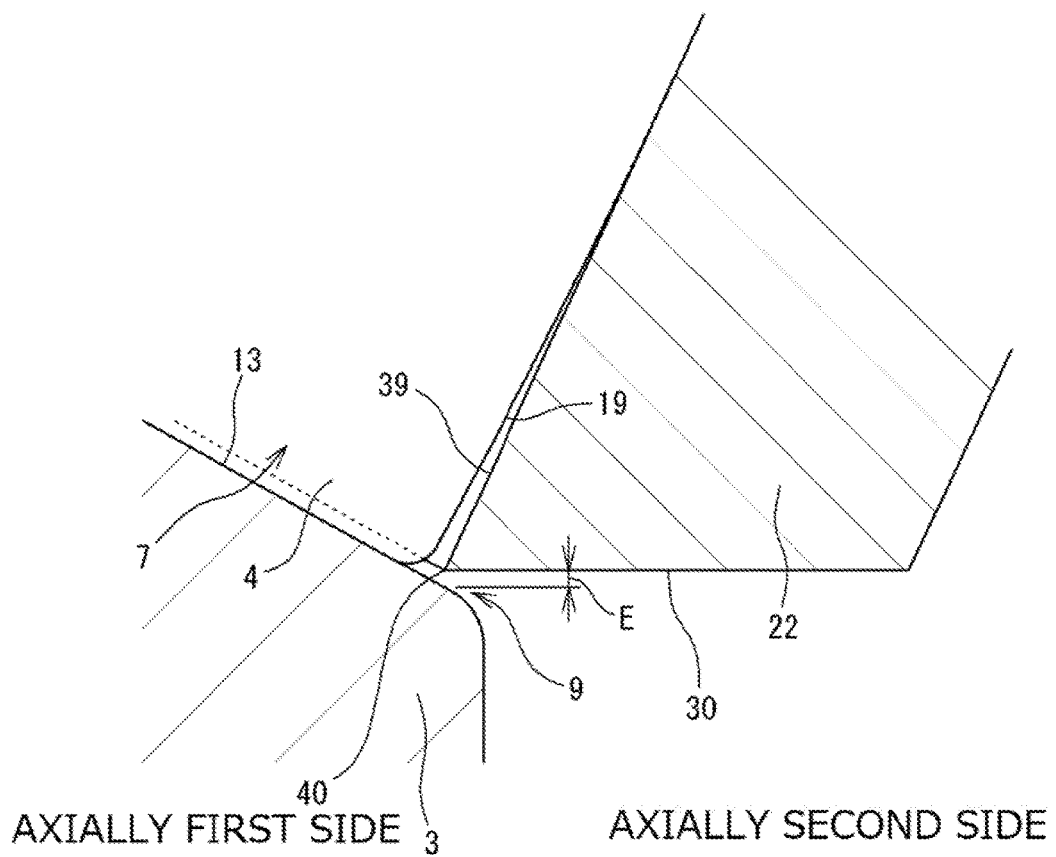
FIG. 4 is an enlarged sectional view depicting an axially second side of the tapered roller bearing.

A situation around the outer ring 3 will be described. The outer peripheral surface 30 of the large annular portion 22 of the cage 5 intersects a pocket-side surface 39 of the cage 5 faced by the large end face 19 of each tapered roller 4. As depicted in an enlarged sectional view in FIG. 4, the outer peripheral surface 30 and the pocket-side surface 39 intersect each other so as to form an acute angle between the surfaces 30 and 39. An intersection portion 40 between the outer peripheral surface 30 and the pocket-side surface 39 is positioned inward of the inner peripheral surface (outer raceway surface 13) of the outer ring 3 in the radial direction. The intersection portion 40 and the inner peripheral surface (outer raceway surface 13) of the outer ring 3 are located close to each other, with a minute clearance 9 formed between the intersection portion 40 and the inner peripheral surface. The minute clearance 9 has a radial dimension E of, for example, 0.5 millimeters.

Like the inner ring 2-side minute clearance 8 (see FIG. 1), the outer ring 3-side minute clearance 9 (see FIG. 4) hinders passage of the lubricant present in the annular space 7. In other words, the lubricant flowing through the annular space 7 toward the axially second side as a result of the pump action is more likely to flow along the pocket-side surface 39 than through the minute clearance 9. As a result, the lubricant can remain in the annular space 7. The lubricant having flowed along the pocket-side surface 39 is guided to the rib surface 16 of the large rib 15 (see FIG. 1) positioned on an extension of the pocket-side surface 39. The lubricant can then contribute to lubrication of the above-described sliding contact portion.

As described above, in the tapered roller bearing 10 in the present embodiment, the minute clearances 8, 9 are formed between the inner ring 2 and the large annular portion 22 of the cage 5 and between the outer ring 3 and the large annular portion 22, respectively. Thus, the large annular portion 22 can block the axially second side of the annular space 7 between the inner ring 2 and the outer ring 3 (though the minute clearances 8, 9 are present). This allows the lubricant in the annular space 7 to be restrained from flowing out into the bearing exterior on the axially second side. Thus, even if an environment around the tapered roller bearing is such that only a small amount of lubricant is present in the bearing exterior on the axially first side, the lubricant in the annular space 7 can be effectively utilized to lubricate the tapered roller bearing 10. As a result, temperature elevation of the tapered roller bearing 10 can be suppressed.

The tapered roller bearing 10 in the present embodiment allows the tapered rollers 4 to be stably held. That is, the tapered roller bearing 10 is an outer-ring guiding bearing in which the cage 5 is guided by the outer ring 3, and thus, the cage can rotate stably during rotation of the bearing. The tapered rollers 4 are held by the thus stabilized cage 5. Consequently, even if the tapered roller bearing 10 is used for a rotating machine (a travel driving system in a construction machine such as a wheel loader) in which the tapered roller bearing 10 frequently repeats forward and backward rotations, the tapered roller bearing 10, compared to a rolling-element guiding bearing, allows behavior of the tapered rollers 4 to be stabilized to suppress possible skewing. The rolling-element guiding bearing is a bearing in which the cage is positioned in the radial direction by the tapered rollers.

Figure 5:
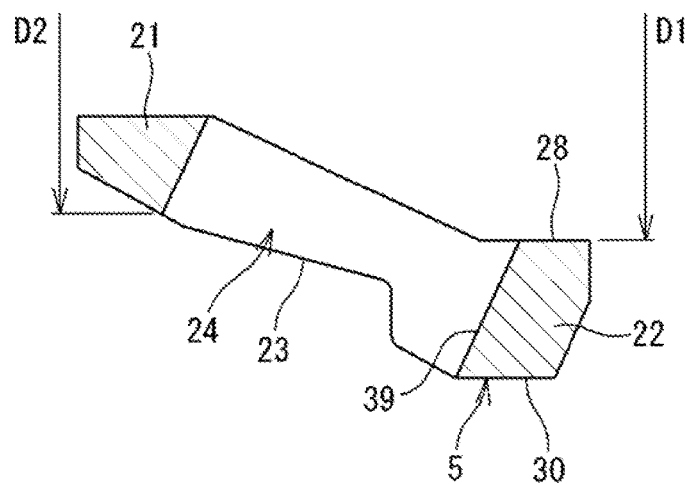
FIG. 5 is a sectional view of the cage.
Figure 6:
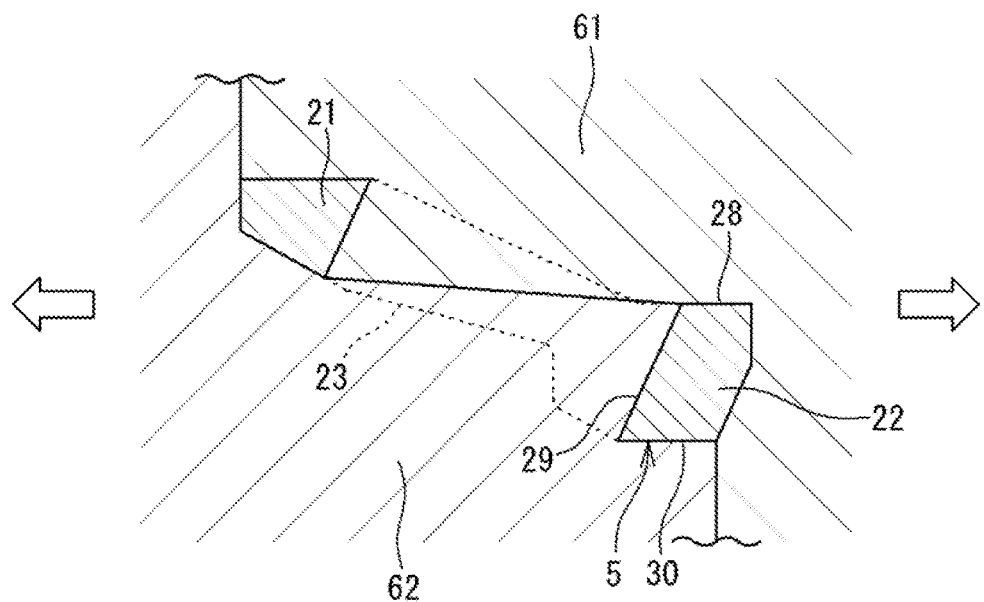
FIG. 6 is a diagram illustrating a section of a mold used to form the cage.
Figure 7:
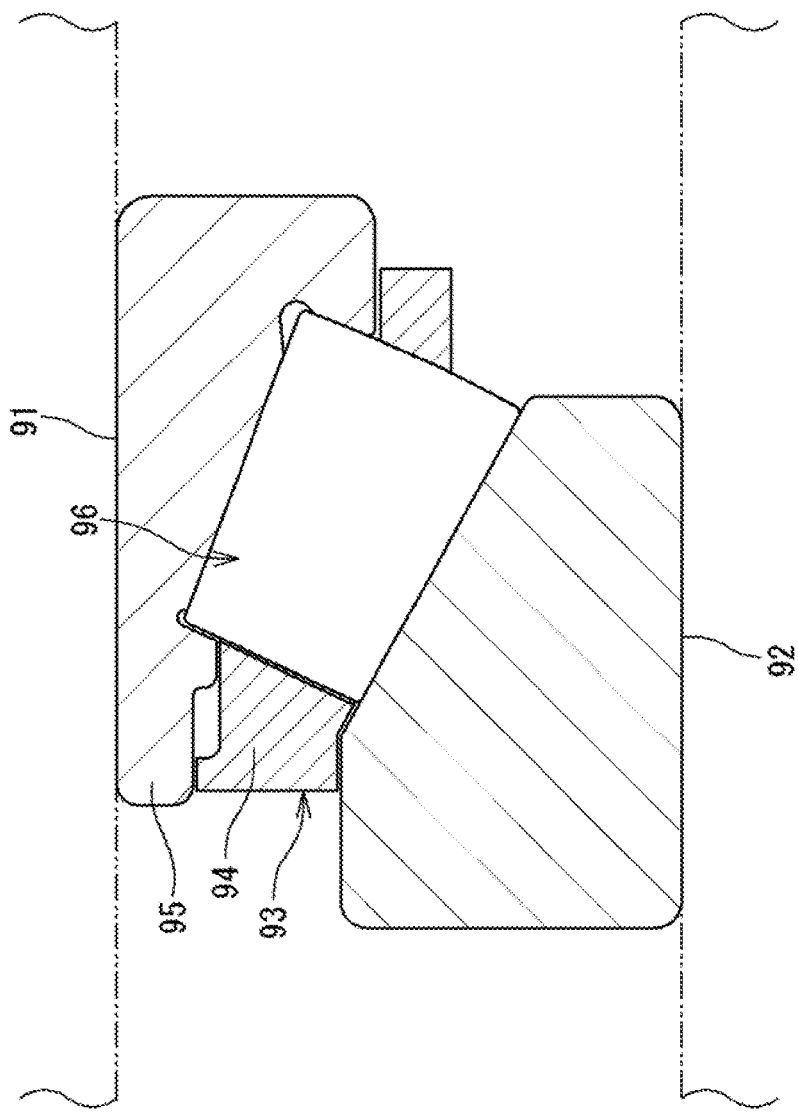
FIG. 7 is a sectional view of a conventional tapered roller bearing.

FIG. 5 is a sectional view of the cage 5. The cage 5 in the present embodiment is formed of a thermoplastic resin and manufactured by injection molding. As a mold for injection molding, only two split mold segments 61, 62 (see FIG. 6) are used that are separated from each other in the axial direction. Thus, as depicted in FIG. 5, in the cage 5, a minimum bore diameter D1 of the large annular portion 22 is larger than a maximum outside diameter D2 of the small annular portion 21 (D1>D2). This configuration facilitates a demolding operation for removing the cage 5 resulting from injection molding, from the mold (split mold segments 61, 62), and is thus suitable for mass production of the cage 5. Although not depicted in the drawings, if, unlike in the form depicted in FIG. 5, the minimum bore diameter D1 of the large annular portion 22 is smaller than the maximum outside diameter D2 of the small annular portion 21 (D1<D2), the split mold segments that are separated from each other in the axial direction is precluded from being adopted. Thus, for example, a partial mold is further needed that is moved in the radial direction in order to form the pockets 24, leading to a complicated mold configuration.

As described above, the cage 5 can come into contact with the inner peripheral surface (outer raceway surface 13) of the outer ring 3. This contact allows the cage 5 to be positioned in the radial direction. To be positioned by the outer ring 3 as described above, the cage 5 in the present embodiment (see FIG. 2) is configured such that the each retaining portion 51 having the second guide surface 32 is continuous with the large annular portion 22 (the retaining portion 51 is integrated with the large annular portion 22). Thus, the outer peripheral surface 30 of the large annular portion 22 and the radially outer surface (second guide surface 32) of the retaining portion 51 are formed to be continuous with each other. The inner peripheral surface of the outer ring 3 can be brought into contact with a part of a surface 65 including the outer peripheral surface 30 of the large annular portion 22 and the radially outer surface (second guide surface 32) of the retaining portion 51. This contact allows the cage 5 to be positioned in the radial direction. In this configuration, each retaining portion 51 is continuous with the large annular portion 22 that blocks the axially second side of the annular space 7. This simplifies the shape of the axially second side of the cage 5 and also simplifies the shape of the mold (split mold segments 61, 62) used to form this portion of the cage 5.

As described above, in the tapered roller bearing 10 in the present embodiment, the lubricant can be fed into the annular space 7 through the space portion 25 located on the axially first side, enabling the whole bearing interior to be more appropriately lubricated. The lubricant in the annular space 7 is fed into the area between the rib surface 16 of the large rib 15 of the inner ring 2 and the large end face 19 of each tapered roller 4, where particularly significant heat generation occurs. As a result, the temperature elevation of the tapered roller bearing 10 can be suppressed.

The above-described embodiment is illustrative in every way and is not restrictive. In other words, the tapered roller bearing in the present invention is not limited to the illustrated forms but may be in any other form within the scope of the present invention. In the above-described embodiment, the tapered roller bearing 10 is used for a differential pinion in a construction machine. However, the tapered roller bearing 10 may be used for any other rotating machine.

Therefore, even if the environment around the tapered roller bearing is such that only a small amount of lubricant is present around the bearing, the tapered roller bearing in the present invention enables the lubricant to be effectively utilized, allowing the temperature elevation of the bearing to be suppressed.

What is claimed is:

1. A tapered roller bearing comprising:
    an inner ring having, on an outer peripheral side, a conical inner raceway surface with a diameter increasing from an axially first side toward an axially second side;
    an outer ring having, on an inner peripheral side, a conical outer raceway surface with a diameter increasing from the axially first side toward the axially second side;
    a plurality of tapered rollers provided in an annular space formed between the inner ring and the outer ring, the plurality of tapered rollers rolling on the inner raceway surface and the outer raceway surface; and
    an annular cage holding the tapered rollers, the cage including:
        a first annular portion positioned toward the axially first side with respect to the tapered rollers;
        a second annular portion positioned toward the axially second side with respect to the tapered rollers;
        a plurality of cage bars coupling the first annular portion and the second annular portion together, each of the plurality of cage bars having, on an axially second side of each cage bar, a retaining portion contacting a corresponding tapered roller from a radially outer side of the corresponding tapered roller and inhibiting the corresponding tapered roller from falling off, a radially outer surface of the retaining portion and an outer peripheral surface of the second annular portion being formed to be continuous with each other, and a surface including the radially outer surface and the outer peripheral surface is enabled to contact an inner peripheral surface of the outer ring so that the contact allows the cage to be positioned in a radial direction; and
        a clearance formed between (i) the inner ring and the second annular portion, and (ii) the outer ring and the second annular portion, respectively.

2. The tapered roller bearing according to claim 1, wherein:
    the cage is formed of a thermoplastic resin, and
    a minimum bore diameter of the second annular portion is larger than a maximum outside diameter of the first annular portion.

* * * * *